Figure 1:
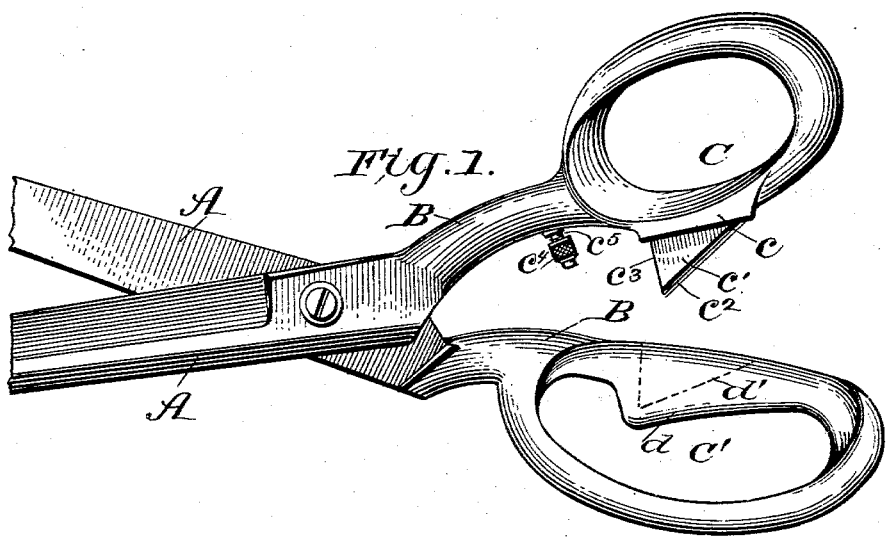

No. 739,643. PATENTED SEPT. 22, 1903.
M. H. BOLSINGER.
BUTTONHOLE CUTTING ATTACHMENT FOR SCISSORS OR SHEARS.
APPLICATION FILED FEB. 20, 1903.
NO MODEL.

WITNESSES:
Jos. A. Ryan
Geo. S. Brock

INVENTOR
M. H. Bolsinger.
BY Munn & Co.
ATTORNEYS.

No. 739,643.  Patented September 22, 1903.

UNITED STATES PATENT OFFICE.

MILTON H. BOLSINGER, OF WINDBER, PENNSYLVANIA, ASSIGNOR OF ONE-HALF TO GEORGE B. SOMERVILLE, OF WINDBER, PENNSYLVANIA.

BUTTONHOLE-CUTTING ATTACHMENT FOR SCISSORS OR SHEARS.

SPECIFICATION forming part of Letters Patent No. 739,643, dated September 22, 1903.

Application filed February 20, 1903. Serial No. 144,186. (No model.)

*To all whom it may concern:*

Be it known that I, MILTON H. BOLSINGER, of Windber, in the county of Somerset and State of Pennsylvania, have invented a new and useful Improvement in Buttonhole-Cutting Attachments for Scissors or Shears, of which the following is a specification.

My invention relates to an improvement in scissors and shears, its object being to provide an attachment forming a part of an ordinary pair of scissors or shears, whereby they may be used for cutting buttonholes, as well as for ordinary purposes, and also for adjusting the same for cutting different sizes of buttonholes.

My invention consists in certain novel features of construction, arrangement, and combination of parts, as will be hereinafter fully described, and pointed out in the drawings, in which—

Figure 2:
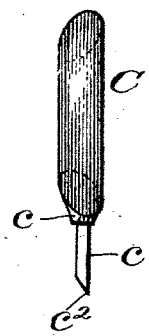
Figure 3:

Figure 1 is a perspective view of a pair of scissors, showing my improved attachment. Fig. 2 is an end view of one of the handles carrying the cutter. Fig. 3 is an edge view of the other handle, showing the mortise therein.

A A represent the blades of a pair of ordinary scissors or shears, while B B represent the shanks of the same.

C represents one of the handles, and C' the other handle. The handle C is provided on its inner face with a projection or anvil $c$, which is made integral with said handle and the face of which is made flat. Projecting from said anvil and preferably integral therewith is a triangular-shaped blade $c'$, the oblique edge $c^2$ of which is beveled to form a cutting edge. Said blade is preferably made in the shape of a right triangle, the front edge $c^3$ of which is perpendicular to the face of the anvil. Located on the shank of the blade carrying the handle C is a set-screw $c^4$, located forward of the cutting-blade $c'$, and said set-screw fits on a threaded pin $c^5$, projecting inwardly from the shank of the aforesaid blade.

The handle D' is made with an integral enlargement $d$, which serves to give a better grip for the fingers and also to receive and guide the cutting-blade $c'$. In order to do this, the handle D is provided with a triangular-shaped mortise or recess $d'$ in its inner face, said mortise or recess occupying the enlargement $d$ on said handle C'. The shape of the mortise is similar to the cutting-blade $c'$.

To cut a buttonhole the full size of the length of the cutting-blade, the set-screw $c^4$ will be screwed home on the screw-pin $c^5$, when the handles may be brought entirely together without said set-screw abutting the opposite shank. The material in which the buttonhole is to be cut is now placed between the handles in its proper position and the handles brought together. The blade $c'$ passes through the material and into the mortise or recess $d'$ until it is stopped by the anvil or projection $c$. To cut buttonholes of smaller sizes, the set-screw $c^4$ is screwed away from the shank to which it is attached until the desired amount of separation between the handles to give a definite length of line drawn from the front edge of the cutting-blade to the oblique edge or hypotenuse is secured, said line being taken parallel, or approximately so, with the flat face of the projection or anvil $c$.

It will thus be seen that with my improved attachment any size of buttonhole from the extreme length of the blade $c'$ to the smallest hole can be cut by simply adjusting the set-screw to or from the shank carrying it.

When the scissors are not in use or when they are to be used for other purposes than buttonhole-cutting, the set-screw is screwed entirely home, when the cutter will be completely housed in the mortise or recess $d'$ and not interfere in the slightest degree with the ordinary use of the scissors or shears.

Having thus described my invention, what claim as new, and desire to secure by Letters Patent, is—

1. The combination with scissors, of an integral triangular cutter projecting from the handle of one of the blades, the other handle provided with an enlargement forming a finger-grip, and having a triangular recess or socket in said enlargement to receive the said triangular cutter and means for regulating the degree of opening between said handles, whereby the size of a buttonhole may be gaged.

2. The combination with scissors, of a hole-cutting blade having a single oblique cutting edge, projecting from the handle of one of the blades and integral therewith, the other handle provided with an enlargement within the same forming a finger-grip, said enlargement having a recess or socket adapted to receive the hole-cutting blade, and means for regulating the degree of opening between the said handles.

3. The combination with scissors, of a flat table or anvil projecting from the handle of one of the blades, a triangular hole-cutter projecting from said table or anvil, said cutter and anvil integral with the handle and said triangular cutter having its forward edge flat and an oblique cutting edge, the other handle provided with an enlargement within the same forming a finger-grip and having a triangular recess or socket extending into said enlargement, said recess adapted to receive the triangular cutter, and means for regulating the degree of penetration of the cutter into said recess, whereby the size of holes cut by the oblique cutting edge may be gaged.

4. The combination with scissors, of a flat table or anvil projecting from the handle of one of the blades, a right triangular cutter projecting from said table, the cutter and table being integral with said handle and said triangular cutter having its oblique edge or hypotenuse beveled to form a cutting edge, the other handle provided with an enlargement within the same to form a finger-grip, said enlargement having a recess or socket therein to receive the triangular cutter, a screw-threaded pin projecting from the shank of one of the blades and a thumb-nut on said pin to regulate the degree of penetration of the cutter into the mortise to gage the size of holes to be cut by said triangular cutter.

MILTON H. BOLSINGER.

Witnesses:
  IRA J. SMITH,
  WILLIAM P. KELLEY.